United States Patent
Michaels et al.

(10) Patent No.: US 11,529,890 B2
(45) Date of Patent: Dec. 20, 2022

(54) VEHICLE SENSOR ASSEMBLY AND A SENSOR-MOUNT ASSEMBLY

(71) Applicant: GM GLOBAL TECHNOLOGY OPERATIONS LLC, Detroit, MI (US)

(72) Inventors: Christopher A. Michaels, Milford, MI (US); Julie A. Bryce, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 494 days.

(21) Appl. No.: 16/700,437

(22) Filed: Dec. 2, 2019

(65) Prior Publication Data

US 2021/0162886 A1    Jun. 3, 2021

(51) Int. Cl.
*G01L 5/00* (2006.01)
*B60M 1/28* (2006.01)

(52) U.S. Cl.
CPC ............. *B60M 1/28* (2013.01); *G01L 5/0057* (2013.01); *B60L 2200/26* (2013.01)

(58) Field of Classification Search
CPC .... B60M 1/28; G01L 5/0057; B60L 2200/26; G01D 11/30; G01M 17/007
See application file for complete search history.

(56) References Cited

U.S. PATENT DOCUMENTS

| | | | | |
|---|---|---|---|---|
| 7,854,453 B2* | 12/2010 | Tanabe | ................ | B60R 21/0136 340/436 |
| 9,956,993 B1* | 5/2018 | Klop | ..................... | B60R 19/483 |
| 10,797,384 B2* | 10/2020 | Singh | .................. | H01Q 1/3283 |
| 11,203,313 B2* | 12/2021 | Momii | ................. | G01D 11/245 |
| 11,285,897 B2* | 3/2022 | Schulz | .................. | B60R 19/483 |
| 11,292,410 B2* | 4/2022 | Keysberg | .............. | G01S 13/931 |
| 2007/0273166 A1* | 11/2007 | Tanabe | ................ | B60R 21/0136 293/102 |
| 2016/0231417 A1* | 8/2016 | Aoki | ....................... | G01S 7/032 |
| 2019/0198986 A1 | 6/2019 | Singh | | |
| 2021/0086712 A1* | 3/2021 | Keysberg | ................ | G01S 7/027 |
| 2021/0107418 A1* | 4/2021 | Schulz | .................. | B60R 19/483 |
| 2021/0291767 A1* | 9/2021 | Momii | .................. | B60R 19/483 |

FOREIGN PATENT DOCUMENTS

| | | |
|---|---|---|
| DE | 102017009057 A1 | 3/2019 |
| DE | 102018210094 A1 | 12/2019 |
| DE | 102019131663 A1 | 5/2021 |

\* cited by examiner

*Primary Examiner* — Freddie Kirkland, III
(74) *Attorney, Agent, or Firm* — Quinn IP Law

(57) ABSTRACT

A vehicle sensor assembly includes a panel having a first side and a second side. The vehicle sensor assembly also includes a beam spaced from the panel relative to the second side. The vehicle sensor assembly further includes a mount including a first portion fixed to the beam. In addition, the vehicle sensor assembly includes a sensor coupled to the mount. The mount includes a second portion coupled to the first portion and the sensor is fixed to the second portion to define a subassembly unit. The subassembly unit is movable relative to the first portion in response to a force applied to the first side of the panel which causes the second side of the panel to engage part of the mount to move the subassembly unit. A sensor-mount assembly includes the beam, the mount, and the sensor coupled to the mount.

20 Claims, 4 Drawing Sheets

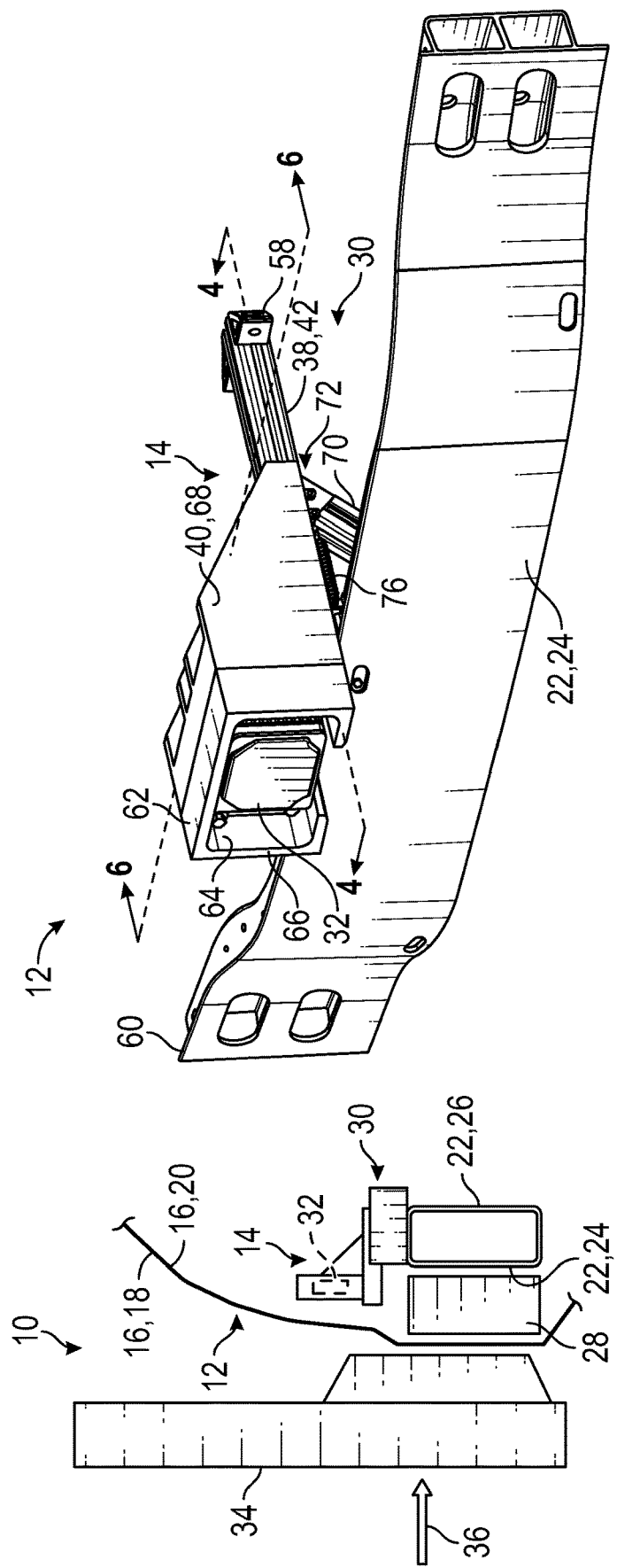

VEHICLE SENSOR ASSEMBLY AND A SENSOR-MOUNT ASSEMBLY

INTRODUCTION

Vehicles may have various testing or regulations to comply with before reaching the consumer market. For example, outer panels of a vehicle may be subject to various testing, such as low speed pendulum testing, high and low speed vehicle driving testing, and external object/human testing. In the low speed pendulum test, a force is applied to an outer panel of the vehicle, which causes the panel to move in the direction of the force. Various internal components of the vehicle, such as one or more sensors, are spaced far enough away from the panel so that during this test, the panel does not engage the sensors, either directly or indirectly.

SUMMARY

The present disclosure provides a vehicle sensor assembly that includes a panel having a first side and a second side. The vehicle sensor assembly also includes a beam spaced from the panel relative to the second side. The vehicle sensor assembly further includes a mount including a first portion fixed to the beam. In addition, the vehicle sensor assembly includes a sensor coupled to the mount. The mount includes a second portion coupled to the first portion and the sensor is fixed to the second portion to define a subassembly unit. The subassembly unit is movable relative to the first portion in response to a force applied to the first side of the panel which causes the second side of the panel to engage part of the mount to move the subassembly unit.

The vehicle sensor assembly optionally includes one or more of the following:
  A) the first portion includes a rail;
  B) the second portion includes a trolley;
  C) the subassembly unit is movable relative to the first portion between an initial position and a displaced position, and in certain configurations, the trolley is coupled to the rail and movable relative to the rail between the initial position and the displaced position, and the subassembly unit moves to the displaced position when the force is applied;
  D) a return attached to the trolley to move the trolley from the displaced position back to the initial position when the force is removed;
  E) the return includes a first end fixed to the trolley and a second end fixed to the beam;
  F) the return is defined as a spring;
  G) the mount includes a shroud that surrounds the sensor, and in certain configurations, the second portion includes the shroud;
  H) the shroud includes a flange that extends outwardly toward the second side of the panel to a distal end that faces the second side;
  I) the flange surrounds the sensor such that the sensor is recessed behind the distal end and inside the flange;
  J) the shroud is part of the second portion, and the second side of the panel engages the distal end of the flange when the force is applied to the panel;
  K) the second portion includes a carriage;
  L) the shroud is fixed to the carriage;
  M) the carriage is fixed to the trolley;
  N) the subassembly unit includes the shroud and the carriage;
  O) the mount includes a brace fixed to the beam and the rail, and the brace supports the subassembly unit;
  P) the beam includes a first side portion that faces toward the second side of the panel and a second side portion that opposes the first side portion;
  Q) the brace extends outwardly away from the second side portion and supports a middle portion of the rail;
  R) a first stop fixed to one end of the rail and a second stop fixed to another end of the rail;
  S) the first and second stops prevent the trolley from detaching from the rail during movement between the initial and displaced positions; and
  T) the shroud is disposed axially between the second side of the panel and the beam when the mount is in the initial position.

The present disclosure also provides a sensor-mount assembly that includes a beam and a mount. The mount includes a first portion fixed to the beam. The sensor-mount assembly also includes a sensor coupled to the mount. The mount includes a second portion coupled to the first portion and the sensor is fixed to the second portion to define a subassembly unit. The subassembly unit is movable relative to the first portion in response to a force indirectly applied to the mount to move the subassembly unit.

The sensor-mount assembly optionally includes one or more of the following:
  A) the first portion includes a rail;
  B) the second portion includes a trolley;
  C) the trolley is coupled to the rail and movable relative to the rail between an initial position and a displaced position, and the trolley moves to the displaced position in response to the force;
  D) a return attached to the trolley to move the trolley from the displaced position back to the initial position when the force is removed;
  E) the mount includes a shroud having a flange that extends outwardly away from the rail to a distal end, and the flange surrounds the sensor such that the sensor is recessed behind the distal end and inside the flange; and
  F) the force is indirectly applied to the distal end of the flange to move the subassembly unit to the displaced position.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

BRIEF DESCRIPTION OF THE DRAWINGS

FIG. 1 is a schematic fragmentary cross-sectional view of a vehicle with a vehicle sensor assembly and a sensor-mount assembly coupled to the vehicle.

FIG. 2 is a schematic perspective front view of the sensor-mount assembly, with a beam supporting a sensor, and the sensor is supported on a movable platform.

DETAILED DESCRIPTION

Figure 3:
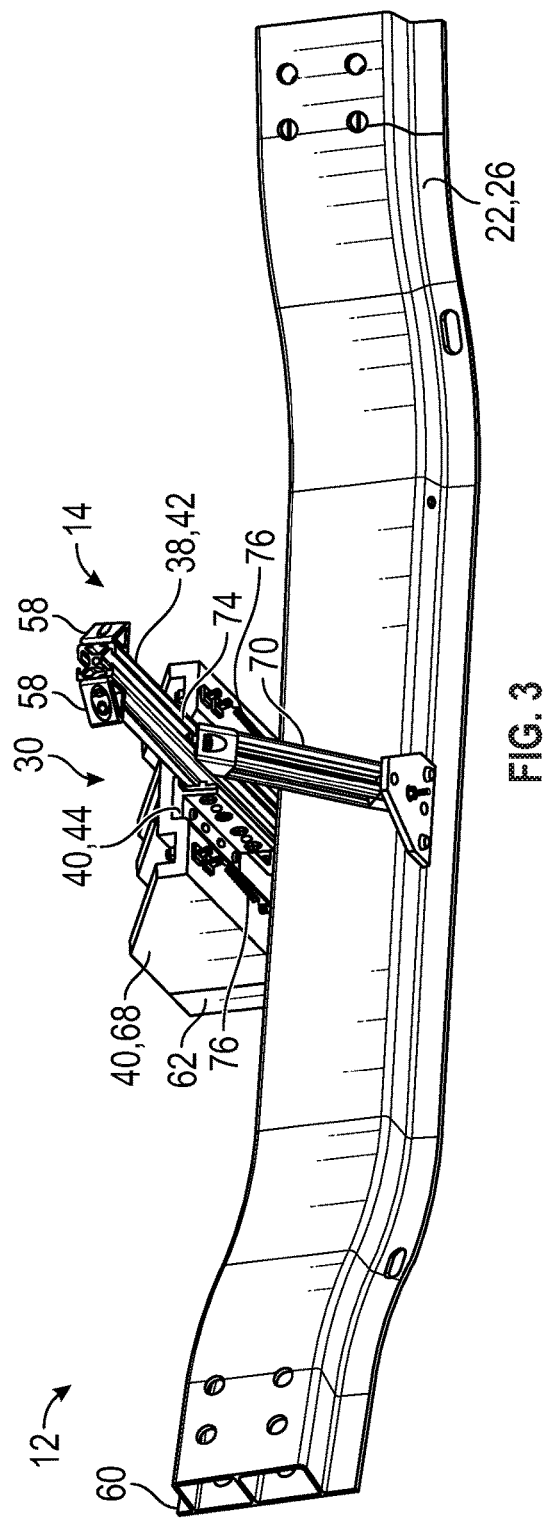
FIG. 3 is a schematic perspective rear view of the sensor-mount assembly of FIG. 2.

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Referring to the FIGS., wherein like numerals indicate like or corresponding parts throughout the several views, a vehicle 10, a vehicle sensor assembly 12, and a sensor-mount assembly 14 are generally shown in FIG. 1. The sensor-mount assembly 14 is a subassembly of the vehicle sensor assembly 12, and will be briefly discussed below. Non-limiting examples of the vehicle 10 may include a car, a truck, a motorcycle, an off-road vehicle, a farm vehicle, a watercraft, an aircraft, or any other suitable moveable platform. Additionally, the vehicle 10 may be manually driven via a user or the vehicle 10 may be autonomously driven. It is to be appreciated that alternatively, the vehicle sensor assembly 12 may be used in a non-vehicle application, such as, farm equipment, stationary platforms, etc.

FIG. 1 is a schematic to generally illustrate various general features of the vehicle sensor assembly 12 and the sensor-mount assembly 14 relative to part of the vehicle 10. FIGS. 2-6 are more detailed schematic illustrations that may be suitable for use in FIG. 1.

Referring to FIG. 1, the vehicle 10, and more specifically, the vehicle sensor assembly 12 includes a panel 16 that generally surrounds at least part of the vehicle 10. In certain configurations, a plurality of the panels 16 may be utilized to surround the vehicle 10. Therefore, one or more of the panels 16 may be disposed along a front of the vehicle 10, a rear of the vehicle 10, and/or one or more sides of the vehicle 10. FIG. 1 is illustrative of any of these locations, i.e., the front, the rear and/or the sides of the vehicle 10. Generally, the panel 16 may include a fascia, a grille, etc., depending on the location of the panel 16.

Generally, the panel(s) 16 may present an outer shell of the vehicle 10. More specifically, the panel 16 includes a first side 18 and a second side 20, and the first side 18 of the panel(s) 16 may be visible outside of the vehicle 10, and thus, provide an aesthetic outer appearance. The second side 20 of the panel(s) 16 opposes the first side 18 of the respective panel(s) 16. Therefore, the second side 20 of the panel(s) 16 are not visible from outside of the vehicle 10.

Continuing with FIG. 1, the vehicle 10, and more specifically, the vehicle sensor assembly 12 also includes a beam 22. Generally, the beam 22 is hidden from view behind the panel(s) 16, and thus, is not visible from outside of the vehicle 10. The beam 22 may be disposed along the front of the vehicle 10, the rear of the vehicle 10 or one or more of the sides 18, 20 of the vehicle 10. In certain configurations, a plurality of the beams 22 may be utilized, and each of the beams 22 may be disposed along one or more of the front, the rear, and the sides 18, 20 of the vehicle 10. The beam 22 may act generally as an energy absorber and/or a support structure. The beam 22 may be any suitable configuration, and as non-limiting examples, the beam(s) 22 may be part of a bumper assembly, a frame, a cradle, a fixture, etc.

Referring to FIGS. 1-4, the beam 22 may include a first side portion 24 that faces toward the second side 20 of the panel 16 and a second side portion 26 that opposes the first side portion 24. The beam 22 is spaced from the panel 16 relative to the second side 20, and more specifically, the first side portion 24 of the beam 22 is spaced from the second side 20 of the panel 16. Therefore, a gap may be defined between the panel 16 and the beam 22. Optionally, an energy absorber 28 (see FIG. 1) may be disposed in the gap to absorb energy in certain situations.

Turning to FIGS. 2-5, the vehicle sensor assembly 12 also includes a mount 30 coupled to the beam 22, and a sensor 32 coupled to the mount 30. Generally, the mount 30 supports the sensor 32. It is desirable to position the sensor 32 close to the panel 16 to maximize an area that the sensor 32 may read/compile information. For example, the sensor 32 may have a viewing area, and depending on the location of the sensor 32 relative to the panel 16, the viewing area may be different. Hence, the closer the sensor 32 is to the panel 16, the larger the viewing area as compared to if the sensor 32 is recessed back behind the beam 22, in which case, the viewing area is smaller. Therefore, under normal operation of the sensor 32, the sensor 32 is disposed axially between the second side 20 of the panel 16 and the beam 22. In other words, the sensor 32 is disposed in front of the beam 22 relative to the panel 16 during normal operation of the sensor 32. By positioning the sensor 32 in front of the beam 22 relative to the panel 16, the viewing area of the sensor 32 is maximized. The sensor 32 may have a direct viewing area via an opening in the panel 16, such as, for example, between slats of the grille. It is to be appreciated that the sensor 32 may be used in an autonomously driven vehicle 10 or a manually driven vehicle 10. As non-limiting examples, the sensor 32 may include one or more of camera(s), radar(s), laser(s), sonar, etc., that compiles information regarding the surrounds of the vehicle 10.

Placement of the sensor 32 relative to the panel 16 takes into consideration various testing such as low speed pendulum testing, high and low speed vehicle driving testing, a low speed driving event, and external object testing. As non-limiting examples, in a low speed pendulum test, a low speed driving event, or an external object test, a pendulum 34 (see FIG. 1) or an object places a force 36 (the direction that the force 36 is applied is illustrated in FIG. 1) on the panel 16, which causes the panel 16 to move toward the beam 22. Since the sensor 32 is positioned close to the panel 16 (such as between the panel 16 and the beam 22), it is desirable to allow the sensor 32 to move relative to the beam 22 during these situations or a similar situation. Therefore, part of the mount 30 is movable, which allows the sensor 32 to move relative to the beam 22 in certain situations. As a non-limiting example, when the force 36 is applied on the panel 16 during one of these situations, the panel 16 moves toward the sensor 32, and the sensor 32 may translate back and return to its normal operational position when the force 36 is removed. Allowing the sensor 32 to translate prevents a disruption to the sensor 32, maximizes the area the sensor 32 may read, as well as provides a space saving and improve vehicle 10 styling.

Referring to FIGS. 2-6, the details of the sensor 32 and the mount 30 relative to the beam 22 will be discussed. Generally, a portion of the mount 30 is fixed to the beam 22. More specifically, the mount 30 includes a first portion 38 fixed to the beam 22, and the mount 30 includes a second portion 40 coupled to the first portion 38. The second portion 40 of the mount 30 is movable relative to the first portion 38 in certain situations (examples of the situations are discussed above).

Figure 4:
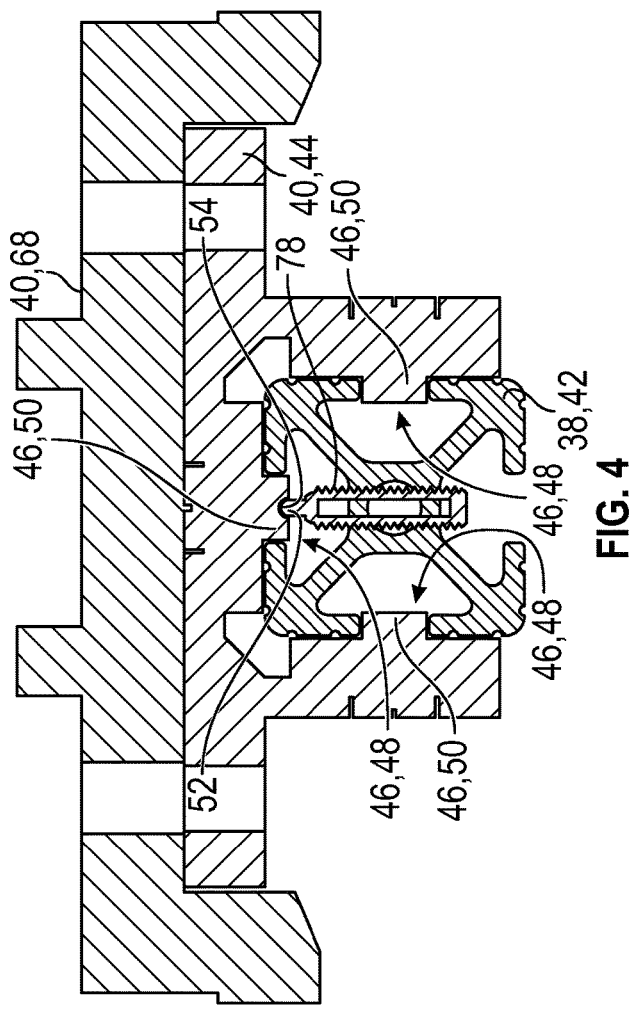
FIG. 4 is a schematic cross-sectional view of the sensor-mount assembly taken from lines 4-4 of FIG. 2.

The sensor 32 is fixed to the second portion 40 to define a subassembly unit. The subassembly unit is movable relative to the first portion 38 in response to the force 36 applied to the first side 18 of the panel 16 which causes the second side 20 of the panel 16 to engage part of the mount 30 to move the subassembly unit. The subassembly unit is movable relative to the first portion 38 of the mount 30 between an initial position and a displaced position. Generally, the subassembly unit moves to the displaced position when the force 36 is applied. Therefore, when no force 36 is applied or the force 36 is removed, the subassembly unit is in the initial position. The subassembly unit is in the initial position during normal operation of the sensor 32. Furthermore, the subassembly unit is positioned relative to the beam 22 such that the beam 22 does not interfere with movement between the initial and displaced positions. FIGS. 1-4 illustrate the subassembly unit in the initial position, and arrow 41 in FIG. 4 illustrates the direction the subassembly unit moves to the displaced position.

As mentioned above, the second portion 40 of the mount 30 is movable relative to the first portion 38 of the mount 30. In certain configurations, as best shown in FIGS. 3 and 4, the first portion 38 may include a rail 42, and the second portion 40 may include a trolley 44. Therefore, the trolley 44 is coupled to the rail 42. The trolley 44 is movable relative to the rail 42 between the initial position and the displaced position. The trolley 44 moves to the displaced position in response to the force 36, and the trolley 44 returns to the initial position when the force 36 is removed.

Figure 6:
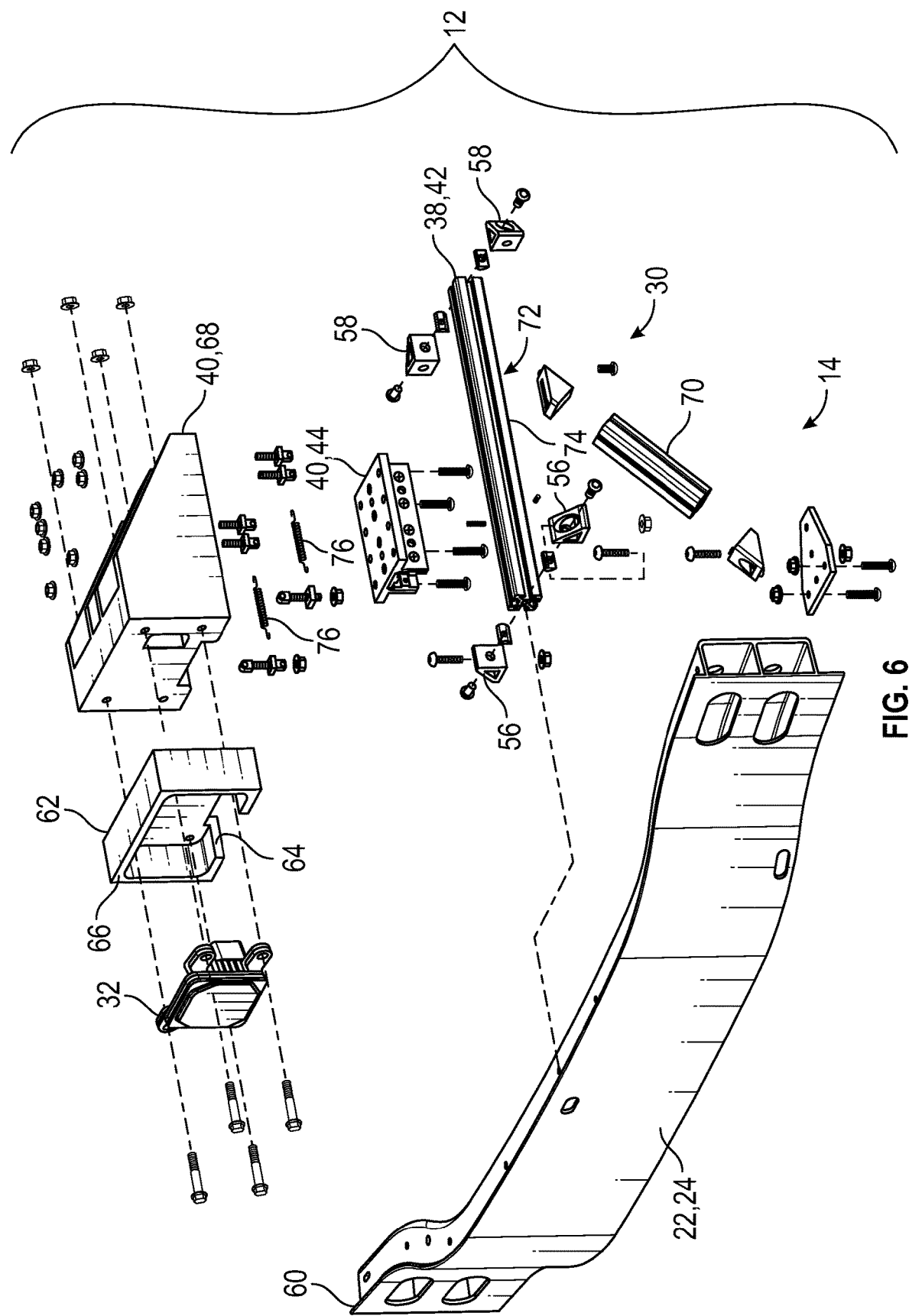
FIG. 6 is a schematic cross-sectional view of the sensor-mount assembly taken from line 6 of FIG. 2.

Turning to FIG. 6, the rail 42 and the trolley 44 each include features 46, 48, 50 that couples the rail 42 and the trolley 44 together, while allowing the trolley 44 to move relative to the rail 42. For example, the features of the rail 42 and the trolley 44 may each include one or more guides 46 or any other suitable features or components. As one specific example, the guide 46 of the rail 42 may define one or more recesses 48, and the guide 46 of the trolley 44 may include one or more protrusions 50 that are disposed in the respective recesses 48.

Figure 5:
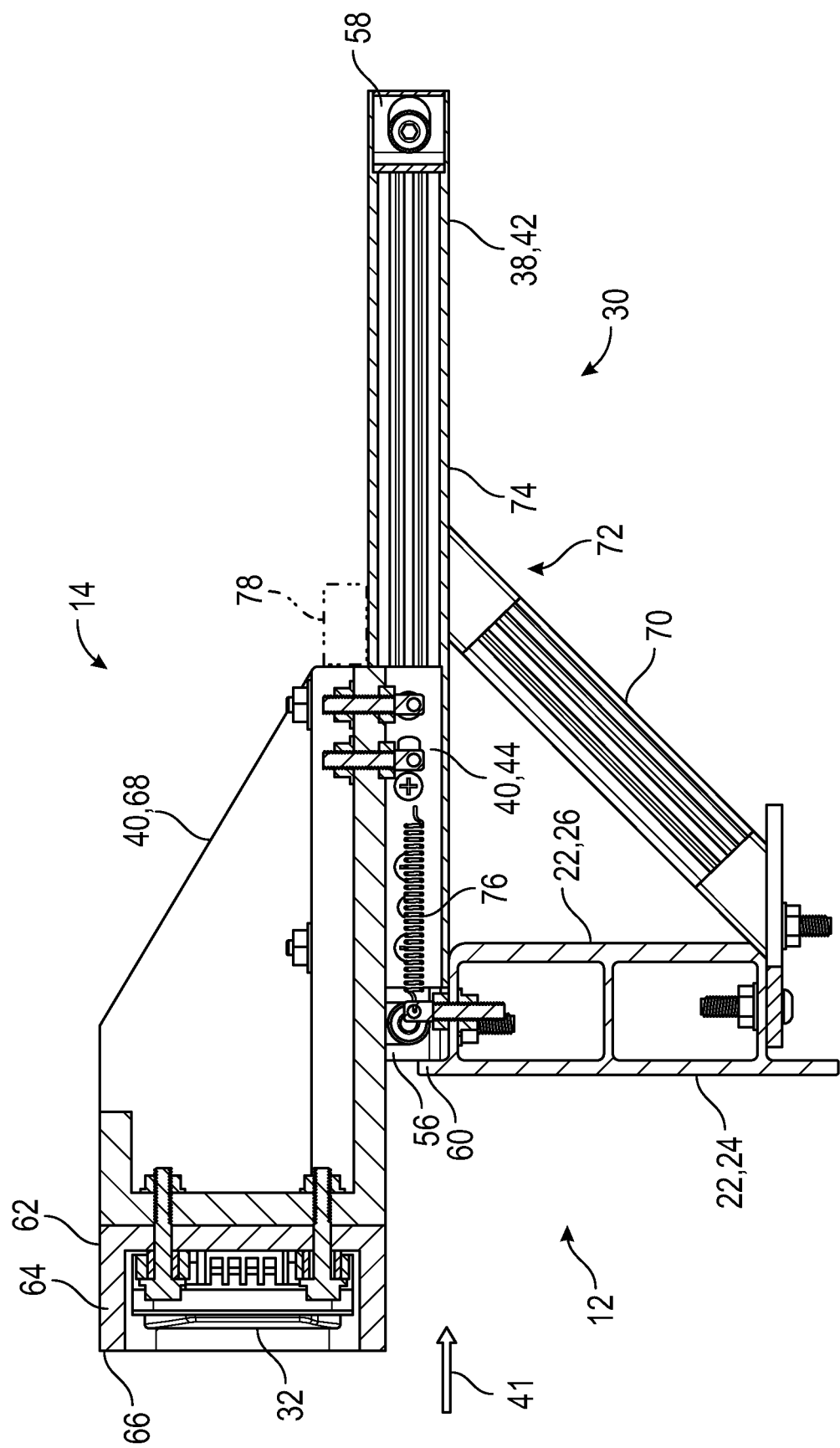
FIG. 5 is a schematic exploded view of the sensor-mount assembly of FIGS. 2 and 3.

As best shown in FIG. 5, the vehicle sensor assembly 12 may further include a first stop 56 and a second stop 58 spaced from the first stop 56, and each of the stops 56, 58 are fixed to the first portion 38 of the mount 30. More specifically, in certain configurations, the first stop 56 is fixed to one end of the rail 42 and the second stop 58 is fixed to another end of the rail 42 (see FIG. 4). The trolley 44 is disposed between the first and second stops 56, 58. Therefore, the first and second stops 56, 58 prevent the trolley 44 from detaching from the rail 42 during movement between the initial and displaced positions. Optionally, as best shown in FIG. 4, the beam 22 may include a lip 60 that extends outwardly toward part of the subassembly unit, and one of the stops 56, 58 abuts the lip 60.

As best shown in FIGS. 1 and 4, the sensor 32 may be recessed behind another part to prevent direct engagement of the panel 16 with the sensor 32 when the panel 16 moves due to the force 36. Therefore, the mount 30 may include a shroud 62 that surrounds the sensor 32. More specifically, the second portion 40 of the mount 30 may include the shroud 62 that surrounds the sensor 32. Generally, the shroud 62 is disposed axially between the second side 20 of the panel 16 and the beam 22 when the mount 30 is in the initial position. The shroud 62 prevents direct engagement of the panel 16 with the sensor 32. Therefore, the shroud 62 acts as a guard to shield the sensor 32 from direct contact via the panel 16. The shroud 62 may be part of the subassembly unit, and thus, the shroud 62 is movable with the sensor 32 between the initial and the displaced positions.

In certain configurations, the shroud 62 may include a flange 64 that extends outwardly toward the second side 20 of the panel 16 to a distal end 66 that faces the second side 20. The flange 64 surrounds the sensor 32 such that the sensor 32 is recessed behind the distal end 66 and inside the flange 64. The second side 20 of the panel 16 engages the distal end 66 of the flange 64 when the force 36 is applied to the panel 16, and this engagement causes the sensor 32 to move to the displaced position. In certain configurations, the distal end 66 of the flange 64 is disposed closer to the panel 16 than the trolley 44 is to the panel 16. In other words, the trolley 44 is spaced farther from the panel 16 than is the distal end 66 of the flange 64.

Optionally, the second portion 40 of the mount 30 may include a carriage 68, and the shroud 62 may be fixed to the carriage 68. In certain configurations, the carriage 68 and the shroud 62 are separate pieces fixed together. In other configurations, the carriage 68 and the shroud 62 are formed as one piece or integral with each other.

Furthermore, the sensor 32 may be fixed to the carriage 68. As such, the carriage 68 may directly support the shroud 62 and the sensor 32. In addition, the carriage 68 may be fixed to the trolley 44. As such, the subassembly unit may also include the carriage 68, and the carriage 68 is movable with the sensor 32 between the initial and displaced positions. In certain configurations, part of the carriage 68 is disposed closer to the panel 16 than part of the trolley 44 is to the panel 16.

As best shown in FIGS. 3 and 4, the mount 30 may include a brace 70 fixed to the beam 22 and the rail 42. Generally, the brace 70 supports the subassembly unit. The brace 70 extends outwardly away from the second side portion 26 of the beam 22 and supports a middle portion 72 of the rail 42. The middle portion 72 of the rail 42 is spaced from the ends of the rail 42. In certain configurations, the brace 70 may extend angularly away from the beam 22 as best shown in FIG. 4. Furthermore, the brace 70 may be fixed to a bottom 74 of the rail 42, such that the brace 70 does not interfere with movement of the trolley 44.

Referring to FIGS. 4 and 5, the vehicle sensor assembly 12 may also include a return 76 that moves the sensor 32 back to the initial position when the force 36 is removed. Furthermore, the return 76 maintains the sensor 32/the subassembly unit in the initial position during normal operation of the sensor 32. In certain configurations, a plurality of returns 76 may be used.

Generally, the return 76 is attached to the beam 22 and the second portion 40 of the mount 30. The return 76 may be directly attached to, or indirectly attached to, the beam 22 and the second portion 40. More specifically, in certain configurations, the return 76 is attached to the trolley 44 to move the trolley 44 from the displaced position back to the initial position when the force 36 is removed. For example, as best shown in FIG. 4, the return 76 may include a first end fixed to the trolley 44 and a second end fixed to the beam 22. It is to be appreciated that the return 76 may be fixed to any suitable portion of the subassembly unit, such as, for example, the trolley 44, the carriage 68, and/or the shroud 62, etc., and the return 76 may be fixed to any suitable portion of the stationary component, such as the beam 22, the brace 70 and/or the rail 42, etc.

The return 76 may be any suitable configuration to move the sensor 32 back to the initial position, and as non-limiting examples, the return 76 may be defined as a spring, such as a coil spring, a leaf spring, a cantilever spring, etc.

Optionally, the vehicle sensor assembly 12 may include a latch 78 (shown in phantom lines in FIG. 5) to secure the subassembly unit in the initial position when no force 36 is applied or when the force 36 is removed. Therefore, the latch 78 acts to assist in maintaining the sensor 32 in its normal operational position when no force 36 is being applied. The latch 78 may be fixed to the trolley 44 and/or the carriage 68, and the latch 78 may interact with the rail 42 and/or the beam 22. The latch 78 may include a catch and detent type of configuration, a spring-loaded ball bearing and detent type of configuration, a plunger, or any other suitable configuration to assist in maintaining the sensor 32 in the initial position when no force 36 is being applied.

As one non-limiting example, the latch 78 is shown in FIG. 4 as a spring-loaded plunger that is supported via the rail 42 and engages the trolley 44 to secure the subassembly unit in the initial position when no force 36 is applied or when the force 36 is removed. The spring-loaded plunger is continuously biased into engagement with the trolley 44. The latch 78 may include a spline 52 and one of the protrusions 50 may define a groove 54 that receives the spline 52. The spline 52 may rest in a detent along the groove 54 when the subassembly unit returns to the initial position. It is to be appreciated that, in certain configurations, the rail 42 may include the protrusions 50 and the groove 54, and the trolley 44 may support the latch 78 and the spline 52. In certain configurations, the rail 42 and the trolley 44 may each include a combination of the protrusions 50 and the recesses 48.

As mentioned above, the sensor-mount assembly 14 is subassembly of the vehicle sensor assembly 12. The sensor-mount assembly 14 includes the beam 22, the mount 30, the sensor 32, the subassembly unit, the return 76, and the latch 78 as discussed above, and will not be repeated.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

What is claimed is:

1. A vehicle sensor assembly comprising:
   a panel having a first side and a second side;
   a beam spaced from the panel relative to the second side;
   a mount including a first portion fixed to the beam;
   a sensor coupled to the mount;
   wherein the mount includes a second portion coupled to the first portion and the sensor is fixed to the second portion to define a subassembly unit, and the subassembly unit is movable relative to the first portion in response to a force applied to the first side of the panel which causes the second side of the panel to engage part of the mount to move the subassembly unit; and
   wherein the first portion includes a rail having a middle portion spaced between a pair of ends, and wherein the mount includes a brace fixed to the beam and the middle portion of the rail, and the brace supports the subassembly unit and the middle portion of the rail.

2. The vehicle sensor assembly as set forth in claim 1 wherein:
   the second portion includes a trolley; and
   the trolley is coupled to the rail and movable relative to the rail between an initial position and a displaced position, and the subassembly unit moves to the displaced position when the force is applied.

3. The vehicle sensor assembly as set forth in claim 2 further including a return attached to the trolley to move the trolley from the displaced position back to the initial position when the force is removed.

4. The vehicle sensor assembly as set forth in claim 3 wherein the return includes a first end fixed to the trolley and a second end fixed to the beam.

5. The vehicle sensor assembly as set forth in claim 3 wherein the return is defined as a spring.

6. The vehicle sensor assembly as set forth in claim 1 wherein the mount includes a shroud that surrounds the sensor.

7. The vehicle sensor assembly as set forth in claim 6 wherein the shroud includes a flange that extends outwardly toward the second side of the panel to a distal end that faces the second side, and the flange surrounds the sensor such that the sensor is recessed behind the distal end and inside the flange.

8. The vehicle sensor assembly as set forth in claim 7 wherein the shroud is part of the second portion, and the second side of the panel engages the distal end of the flange when the force is applied to the panel.

9. The vehicle sensor assembly as set forth in claim 6 wherein the second portion includes a carriage and the shroud is fixed to the carriage.

10. The vehicle sensor assembly as set forth in claim 6 wherein:
    the sensor includes a face that faces toward the second side of the panel; and
    the shroud includes a flange that surrounds an outer side edge of the sensor such that the face of the sensor is unobstructed by the flange relative to the second side of the panel.

11. The vehicle sensor assembly as set forth in claim 1 wherein
    the second portion includes a trolley and a shroud that surrounds the sensor.

12. The vehicle sensor assembly as set forth in claim 11 wherein the second portion includes a carriage fixed to the trolley, and the shroud is fixed to the carriage.

13. The vehicle sensor assembly as set forth in claim 12 wherein the subassembly unit includes the shroud and the carriage.

14. The vehicle sensor assembly as set forth in claim 11 wherein:
    the beam includes a first side portion that faces toward the second side of the panel and a second side portion that opposes the first side portion; and
    the brace extends outwardly away from the second side portion.

15. The vehicle sensor assembly as set forth in claim 11:
    further including a first stop fixed to one end of the rail and a second stop fixed to another end of the rail;
    wherein the trolley is coupled to the rail and movable relative to the rail between an initial position and a displaced position, and the subassembly unit moves to the displaced position when the force is applied; and
    wherein the first and second stops prevent the trolley from detaching from the rail during movement between the initial and displaced positions.

16. The vehicle sensor assembly as set forth in claim 1 wherein:
    the subassembly unit is movable relative to the first portion between an initial position and a displaced position, and the subassembly unit moves to the displaced position when the force is applied; and the mount includes a shroud that surrounds the sensor, and the shroud is disposed axially between the second side of the panel and the beam when the mount is in the initial position.

17. A sensor-mount assembly comprising:
a beam;
a mount including a first portion fixed to the beam;
a sensor coupled to the mount;
wherein the mount includes a second portion coupled to the first portion and the sensor is fixed to the second portion to define a subassembly unit, and the subassembly unit is movable relative to the first portion in response to a force indirectly applied to the mount to move the subassembly unit;
wherein the first portion includes a rail;
wherein the second portion includes a trolley;
wherein the trolley is coupled to the rail and is movable relative to the rail between an initial position and a displaced position, and the trolley moves to the displaced position in response to the force; and
a latch disposed inside of the rail and configured to secure the subassembly unit in the initial position when no force is applied.

18. The sensor-mount assembly as set forth in claim 17 further including a return attached to the trolley to move the trolley from the displaced position back to the initial position when the force is removed.

19. The sensor-mount assembly as set forth in claim 17 wherein:
the mount includes a shroud having a flange that extends outwardly away from the rail to a distal end, and the flange surrounds the sensor such that the sensor is recessed behind the distal end and inside the flange; and
the force is indirectly applied to the distal end of the flange to move the subassembly unit to the displaced position.

20. The sensor-mount assembly as set forth in claim 17 wherein:
the mount includes a shroud that surrounds the sensor; and
the sensor includes a face that faces outwardly away from the second portion, and the shroud includes a flange that surrounds an outer side edge of the sensor such that the face of the sensor is unobstructed by the flange.

* * * * *